(12) United States Patent
Stamey

(10) Patent No.: US 11,035,656 B2
(45) Date of Patent: Jun. 15, 2021

(54) OUTER DIMENSIONING MEASUREMENT SYSTEM FOR TUBULARS

(71) Applicant: ATT TECHNOLOGY, LTD., Houston, TX (US)

(72) Inventor: Elliot Morgan Stamey, Houston, TX (US)

(73) Assignee: ATT Technology, Ltd., Houston, TX (US)

( * ) Notice: Subject to any disclaimer, the term of this patent is extended or adjusted under 35 U.S.C. 154(b) by 259 days.

(21) Appl. No.: 16/204,620

(22) Filed: Nov. 29, 2018

(65) Prior Publication Data
US 2020/0173765 A1 Jun. 4, 2020

(51) Int. Cl.
| | |
|---|---|
| *G01B 3/12* | (2006.01) |
| *G01B 7/12* | (2006.01) |
| *G01P 3/44* | (2006.01) |
| *G01D 5/26* | (2006.01) |
| *G01D 5/12* | (2006.01) |
| *G01P 21/00* | (2006.01) |

(52) U.S. Cl.
CPC .............. *G01B 3/12* (2013.01); *G01B 7/12* (2013.01); *G01D 5/12* (2013.01); *G01D 5/26* (2013.01); *G01P 3/44* (2013.01); *G01P 21/00* (2013.01)

(58) Field of Classification Search
CPC . G01B 3/12; G01B 7/12; G01B 5/025; G01B 5/08; G01P 3/44; G01P 21/00; G01D 5/26; G01D 5/12
USPC .................................................. 33/775, 773
See application file for complete search history.

(56) References Cited

U.S. PATENT DOCUMENTS

| | | | |
|---|---|---|---|
| 3,172,208 A | 3/1965 | Lowy | |
| 3,995,466 A | 12/1976 | Kunsman | |
| 4,903,413 A * | 2/1990 | Bellwood | G01B 5/207 33/551 |
| 5,088,207 A * | 2/1992 | Betsill | G01B 5/10 33/1 BB |

(Continued)

FOREIGN PATENT DOCUMENTS

EP  3021070 A1  5/2016

OTHER PUBLICATIONS

PCT International Search Report for International Application No. PCT/US19/63116 dated Mar. 30, 2020 (5 pages).

(Continued)

*Primary Examiner* — Yaritza Guadalupe-McCall
(74) *Attorney, Agent, or Firm* — Clark Hill Strasburger

(57) ABSTRACT

The disclosure relates to an outer dimension measurement apparatus for tubulars. The apparatus includes a first wheel and a second wheel, which may be applied to different sections of a tubular. The ratio between the outer dimensions of the different sections may be estimated based on the relationship between the rates of rotations of the first and second wheels when the tubular is rotated. The apparatus may include a tubular rotation sensor that, with either the first wheel or the second wheel, may be used to determine the outer dimension of the tubular at the point along the tubular's length when the respective wheel is applied. The methods include estimating a ratio between outer dimensions of sections of a tubular and estimating the outer dimension of the tubular at a specific point along its length using embodiments of the apparatus.

13 Claims, 10 Drawing Sheets

(56) References Cited

U.S. PATENT DOCUMENTS

| | | | | |
|---|---|---|---|---|
| 5,182,861 | A * | 2/1993 | Suzuki | B43L 13/024 271/171 |
| 5,197,200 | A | 3/1993 | Bahr et al. | |
| 5,337,485 | A * | 8/1994 | Chien | G01B 5/201 33/550 |
| 5,969,255 | A * | 10/1999 | McLean | B21C 51/00 73/622 |
| 6,568,096 | B1 * | 5/2003 | Svitkin | B23Q 1/76 33/501.02 |
| 6,782,631 | B1 * | 8/2004 | Face, III | G01C 7/04 33/501.02 |
| 7,159,477 | B2 * | 1/2007 | Edwin | G01B 5/08 33/501.08 |
| 7,472,490 | B2 * | 1/2009 | Kube | B24B 5/37 33/551 |
| 8,955,231 | B2 * | 2/2015 | Tu | G01B 5/20 33/787 |
| 9,599,445 | B2 * | 3/2017 | Ito | B24B 49/105 |
| 10,058,976 | B2 * | 8/2018 | Stamey | E21B 17/1085 |
| 10,525,565 | B2 * | 1/2020 | Stamey | B24B 5/355 |
| 2005/0050745 | A1 * | 3/2005 | Akatsuka | G01B 11/2433 33/549 |
| 2005/0120812 | A1 * | 6/2005 | Edwin | G01B 7/281 73/865.8 |
| 2008/0163509 | A1 * | 7/2008 | Kube | G01B 5/207 33/555.1 |
| 2013/0160309 | A1 * | 6/2013 | Logan | G01B 11/105 33/228 |
| 2014/0196296 | A1 * | 7/2014 | Tu | G01B 5/20 33/556 |
| 2015/0040632 | A1 | 2/2015 | Puzio et al. | |
| 2018/0133864 | A1 * | 5/2018 | Stamey | E21B 17/1085 |
| 2018/0311787 | A1 * | 11/2018 | Stamey | B24B 49/04 |
| 2020/0173765 | A1 * | 6/2020 | Stamey | G01B 3/12 |

OTHER PUBLICATIONS

PCT Written Opinion of the International Searching Authority for International Application No. PCT/US16/63116 dated Mar. 30, 2020 (14 pages).

* cited by examiner

OUTER DIMENSIONING MEASUREMENT SYSTEM FOR TUBULARS

BACKGROUND OF THE DISCLOSURE

1. Field of Disclosure

The present disclosure relates to preparation of tubulars for subterranean drilling operations, and specifically for measurement of the outer diameter of tubulars that are irregular or out of round in shape.

2. Description of the Related Art

Drilling tubulars are manufactured of steel or other durable materials for subterranean operations. While drilling tubulars are ideally round, this is typically not the case. The outer diameters of drilling tubulars are often irregular in shape due to: defects in the rolling process that made the tubular, variations in thickness in the walls of the tubular, and additional layers that are disposed on the outer surface of the tubular.

Drilling tubulars used in subterranean operations are subject to abrasion, erosion, and damage from impacts against hard walls of a borehole, as well as debris encountered during drilling. Protective layers may be added to the outer surface of the drilling tubulars, such as hardfacing (or a hardfacing alloy), may be added to the outer surface to prevent or reduce abrasive wear of the drilling tubulars and other downhole components. The hard material, such as tungsten carbide, that acts as the protective layer and is called hardbanding once applied to the drilling tubulars. The hardbanding protects the face of the softer surface of the drilling tubulars or other downhole components. Hardbanding can also create or exacerbate irregularities in the outer diameter of the drilling tubular, such that the outer dimensions cannot be easily calculated.

The repair or removal of hardbanding may also create or increase irregularities in the outer diameter of the drilling tubular. In order for new hardbanding to be applied, some or all of the existing hardbanding must be removed from the drilling tubular and other downhole components. In order for the hardbanding to be removed, the drilling tubular must be removed from the borehole so that a grinding system has access to the hardbanding.

Problems can occur when precision grinding or other operations on the outer surface of the tubular are performed and the outer diameter of the tubular is irregular due to manufacturing or operational damage. The irregularities may be eccentricities (out of round conditions) that are local or present throughout the tubular. The irregularities may also be high or low spots that are independent to out of round conditions of the tubular.

A shortcoming of existing tubular maintenance operations is the assumption that the drilling tubular has a uniform outer diameter. For example, grinding the same depth around the outer surface of the drilling tubular can result in either under grinding of high spots, which leave excess material on the drilling tubular and increases its overall mass, or over grinding of low spots, which can result in structurally weak wall thicknesses in some parts of the tubular.

Another shortcoming in existing tubular maintenance is, in order to avoid the above assumption of a uniform outer diameter, the cost and time for performing meticulous caliper measurements at each part of the pipe to have material added to or removed from the outer surface of the tubular.

What is needed is a tubular outer surface measuring system for irregular tubulars that is time and cost efficient, without sacrificing accuracy.

BRIEF SUMMARY OF THE DISCLOSURE

In aspects, the present disclosure is related to an apparatus and method for preparing drilling tubulars, and, in particular, measuring the outer dimensions of irregularly shaped drilling tubulars.

One embodiment according to the present disclosure includes an apparatus, comprising: a frame; a set of rollers having a length and configured to rotate a tubular and supported by the frame; a first arm supported by the frame; a first wheel disposed on the first arm; a first sensor configured to estimate the rate of rotation of the first wheel; a second arm supported by the frame; a second wheel disposed on the second arm and longitudinally separated along the length of the rollers from the first wheel; a second sensor configured to estimate the rate of rotation of the second wheel; and a processor in communication with the first sensor and the second sensor. The apparatus may also include an actuator disposed between the first arm and the frame and configured to move the first wheel to apply pressure between the first wheel and the tubular and/or an actuator disposed between the second arm and the frame and configured to move the second wheel to apply pressure between the second wheel and the tubular. The first sensor may be disposed on the first arm. The second sensor may be disposed on the second arm. The apparatus may also include a tubular rotation sensor configured to detect an indicator on the tubular, wherein the tubular rotation sensor is in communication with the processor. The tubular rotation sensor may be attached to a tubular rotation sensor arm supported by the frame and configured to position the tubular rotation sensor relative to the tubular.

Another embodiment according to the present disclosure includes a method comprising the steps of: generating a rate of rotation signal based on motion of a first wheel of known diameter in contact with a first section of a rotating tubular; generating a rate of rotation signal based on motion of a second wheel of known diameter in contact with a second section of the rotating tubular; and estimating a ratio of an outer dimension of the first section and an outer dimension of the second section using the rate of rotation signal for the first wheel and the rate of rotation signal for the second wheel. The method may also include one or more of the steps of: rotating the tubular, positioning the first wheel to apply pressure to the first section, and positioning the second wheel to apply pressure to the second section. The method may also include communicating the rate of rotation signal for the first wheel to a processor; and communicating the rate of rotation signal for the second wheel to the processor.

Another embodiment according to the present disclosure includes an apparatus, comprising: a frame; a set of rollers configured to rotate a tubular and supported by the frame; a first arm supported by the frame; a first wheel disposed on the first arm; a first sensor configured to estimate the rate of rotation of the first wheel; a tubular rotation sensor configured to detect an indicator on the tubular; and a processor in communication with the first sensor and the tubular rotation sensor. The apparatus may also include one or more of: an actuator disposed between the first arm and the frame and configured to move the first wheel to apply pressure between the first wheel and the tubular and a tubular rotation sensor arm supported by the frame and configured to position the tubular rotation sensor relative to the tubular. The apparatus may include an actuator disposed between the tubular rotation sensor arm and the frame and configured to move the tubular rotation sensor arm relative to the tubular. The first sensor is disposed on the first arm. The apparatus may also include a second arm supported by the frame; a second wheel disposed on the second arm and longitudinally separated along the length of the rollers from the first wheel; and a second sensor configured to estimate the rate of rotation of the second wheel; wherein the second wheel is longitudinally separated from the first wheel along a length of the set of rollers.

Another embodiment according to the present disclosure includes a method that includes the steps of: generating a rate of rotation signal based on motion of a first wheel of known diameter in contact with a rotating tubular; generating a rate of rotation signal based on detection of an indicator disposed on the rotating tubular; estimating an outer dimension of the tubular using the rate of rotation signal for the first wheel and the rate of rotation signal for the second wheel. The method may also include one or more of the steps of: rotating the tubular, positioning the first wheel to apply pressure to the tubular, and positioning a tubular rotation sensor to detect the indicator. The method may also include communicating the rate of rotation signal for the first wheel to a processor; and communicating the rate of rotation signal for tubular to the processor; wherein the step of estimating the outer dimension of the tubular using the rate of rotation signal for the first wheel and the tubular rotation signal.

Another embodiment according to the present disclosure includes an apparatus, comprising: a frame; a set of rollers having a length and configured to rotate a tubular and supported by the frame; a first arm supported by the frame; a first wheel disposed on the first arm; a first sensor configured to estimate the rate of rotation of the first wheel; a second arm supported by the frame; a second wheel disposed on the second arm and longitudinally separated along the length of the rollers from the first wheel; a second sensor configured to estimate the rate of rotation of the second wheel; a tubular rotation sensor configured to detect an indicator on the tubular; and a processor in communication with the first sensor, the second sensor, and the tubular rotation sensor. The apparatus may also include an actuator disposed between at least one of: the first arm and the frame, the second arm and the frame, and the tubular rotation sensor arm and the frame.

Another embodiment according to the present disclosure includes a method with the steps of: generating a rate of rotation signal based on motion of a first wheel of known diameter in contact with a first section of a rotating tubular; generating a rate of rotation signal based on motion of a second wheel of known diameter in contact with a second section of the rotating tubular; generating a rate of rotation signal based on detection of an indicator disposed on the rotating tubular; estimating a ratio of an outer dimension of the first section and an outer dimension of the second section using the rate of rotation signal for the first wheel and the rate of rotation signal for the second wheel; and estimating an outer dimension of the tubular using the rate of rotation signal for the first wheel and the rate of rotation signal for the second wheel. The method may also include one or more of the steps of: rotating the tubular, positioning the first wheel to apply pressure to the first section, and positioning the second wheel to apply pressure to the second section. The method may also include communicating the rate of rotation signal for the first wheel to a processor; and communicating the rate of rotation signal for the second wheel to the processor.

BRIEF DESCRIPTION OF DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION OF THE DISCLOSURE

Figure 1:
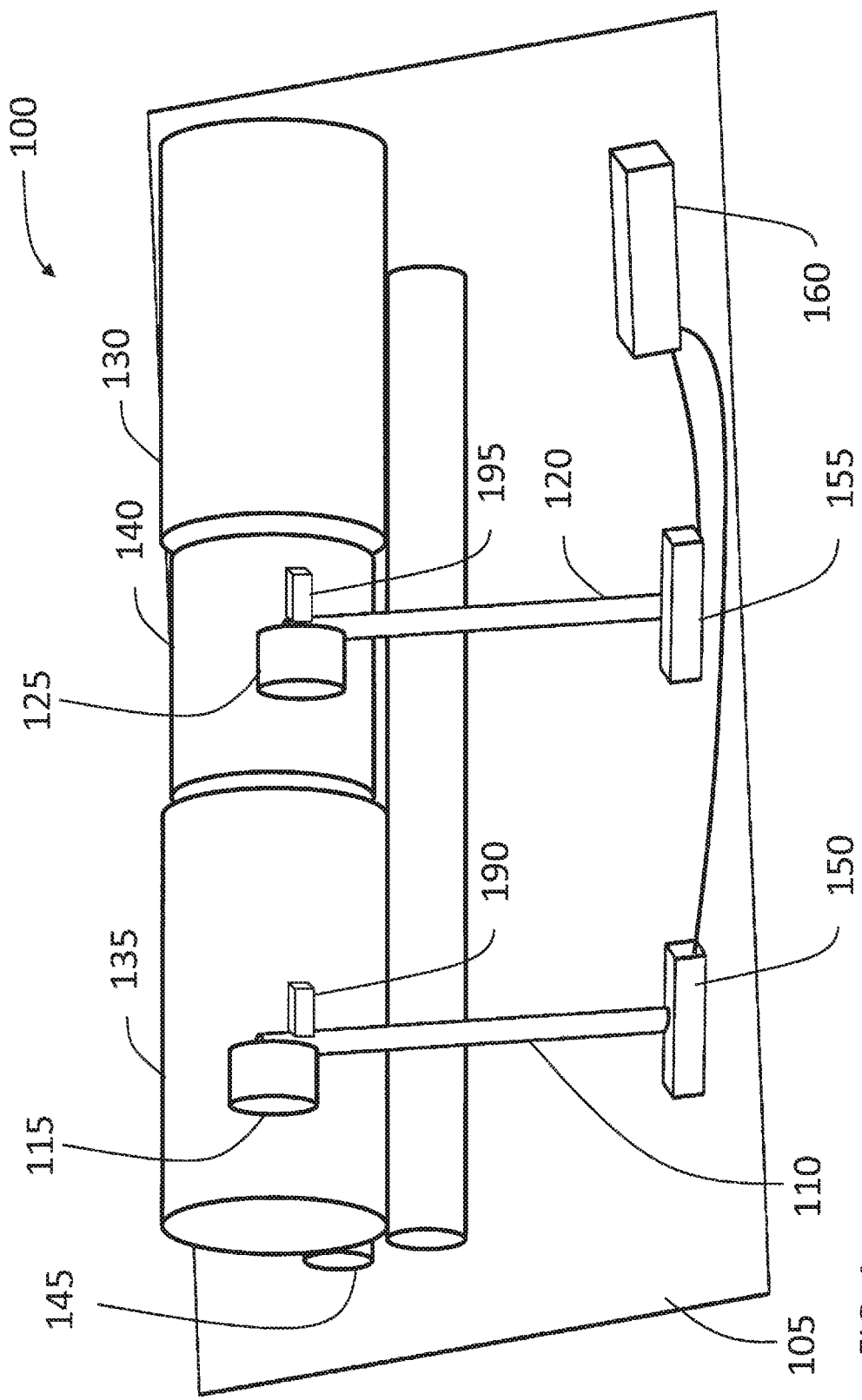
FIG. 1 shows a three-dimensional view diagram of an embodiment of an outer dimension measuring apparatus according to one embodiment of the present disclosure.

Generally, the present disclosure relates to preparation of a drilling tubular for subterranean operations. Specifically, the present disclosure is related to measuring the outer dimensions of oilfield tubulars and pipes.

There are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

FIG. 1 shows an outer dimension measuring apparatus 100 according to one embodiment of the present disclosure. The apparatus 100 may include a frame 105 to support two or more rollers 145. The rollers 145 are disposed in one or more pairs on the frame 105 and configured to support a tubular 130. The tubular 130 is shown with a first section 135 that has a first outer dimension (i.e. perimeter), and a second section 140 that has a second outer dimension. A first arm, such as reference arm 110, is connected to the frame 105 and attached. A first wheel, such as reference wheel 115, is disposed on an end of the reference arm 110. An actuator 150 may be attached between the reference arm 110 and the frame 105 to move the reference arm 110 relative to the frame 105. The reference wheel 115 has a known diameter and a circular shape within specific engineering tolerances selected for the intended accuracy and precision of the apparatus 100 as would be understood by a person of skill in the art. In some instances, the reference wheel diameter or perimeter may be calibrated using a known reference tubular, by caliper measurement, or using a tachometer sensor with a known reference tubular. The actuator 150 is configured to move the reference arm 110 to apply pressure between the reference wheel 115 and the outer surface of the first section 135 of the tubular 130. Suitable actuators may include, but are not limited to, pneumatic piston actuators and other actuators with sufficiently short response times to maintain pressure between the reference wheel 115 and the tubular 130. The required pressure or force may range from an ounce to about 300 pounds (about 0.25 N to about 1330 N) based on the vibration and rolling forces at work to break contact between the reference wheel 115 and the tubular 130 during rotation. In some embodiments, the reference arm 110 may be weighted to apply pressure between the reference wheel 115 and the tubular 130. The pressure between the reference wheel 115 and the first section 135 ensures sufficient friction between the reference wheel 115 and the first section 135 that both rotate without slipping relative to one another. A first sensor 190 may be disposed on the reference arm 110 to measure the rate of rotation of the reference wheel 115.

A second wheel, such as cut wheel 125, is disposed on the end of a second arm, such as cut arm 120, is disposed on the end of the cut arm 120 that is connected to the frame 105. An actuator 155 may be attached between the cut arm 120 and the frame 105 to move the cut arm 120 relative to the frame 105. The cut wheel 125 has a known diameter and a circular shape within specific engineering tolerances selected for the intended accuracy and precision of the apparatus 100 as would be understood by a person of skill in the art. While the second wheel 125 is referred to as a "cut" wheel, there is no implication that a cutting or grinding operation is required to be associated with the apparatus or methods disclosed herein. In some embodiments, the wheels 115, 125 may be encoder wheels, rotary encoders, or shaft encoders. While the reference wheel 115 and the cut wheel 125 both have known diameters, these diameters may be the same or different. The actuator 155 is configured to move the cut arm 120 to apply pressure between the cut wheel 125 and the outer surface of the second section 140 of the tubular 130. The pressure between the cut wheel 125 and the second section 140 provides force to ensure sufficient friction between the cut wheel 125 and the second section 140 that both rotate without slipping relative to one another. A rotation measurement sensor 195 may be disposed on the cut arm 120 to measure the rate of rotation of the cut wheel 125. In some embodiments, the rotation measurement sensors 190, 195 may be disposed on a fixed location relative to the apparatus 100, on the arm 110, 120, on the arm of a cutting, grinding, or measuring tool, or on a rail system the moves with the cutting, grinding, or measuring tool. The reference wheel 115 and the cut wheel 125 are longitudinally spaced relative to the length of the tubular 130. Each of the rotation measurement sensors 190, 195 is in signal communication with a processor 160. The processor 160 may disposed on the frame 105 or in a remote location. While all of the examples herein are presented with regard to the tubular 130; this is exemplary and illustrative, as the apparatuses disclosed above and below may be used to estimate outer perimeters for any cylindrical object, including solid shafts.

Figure 2:
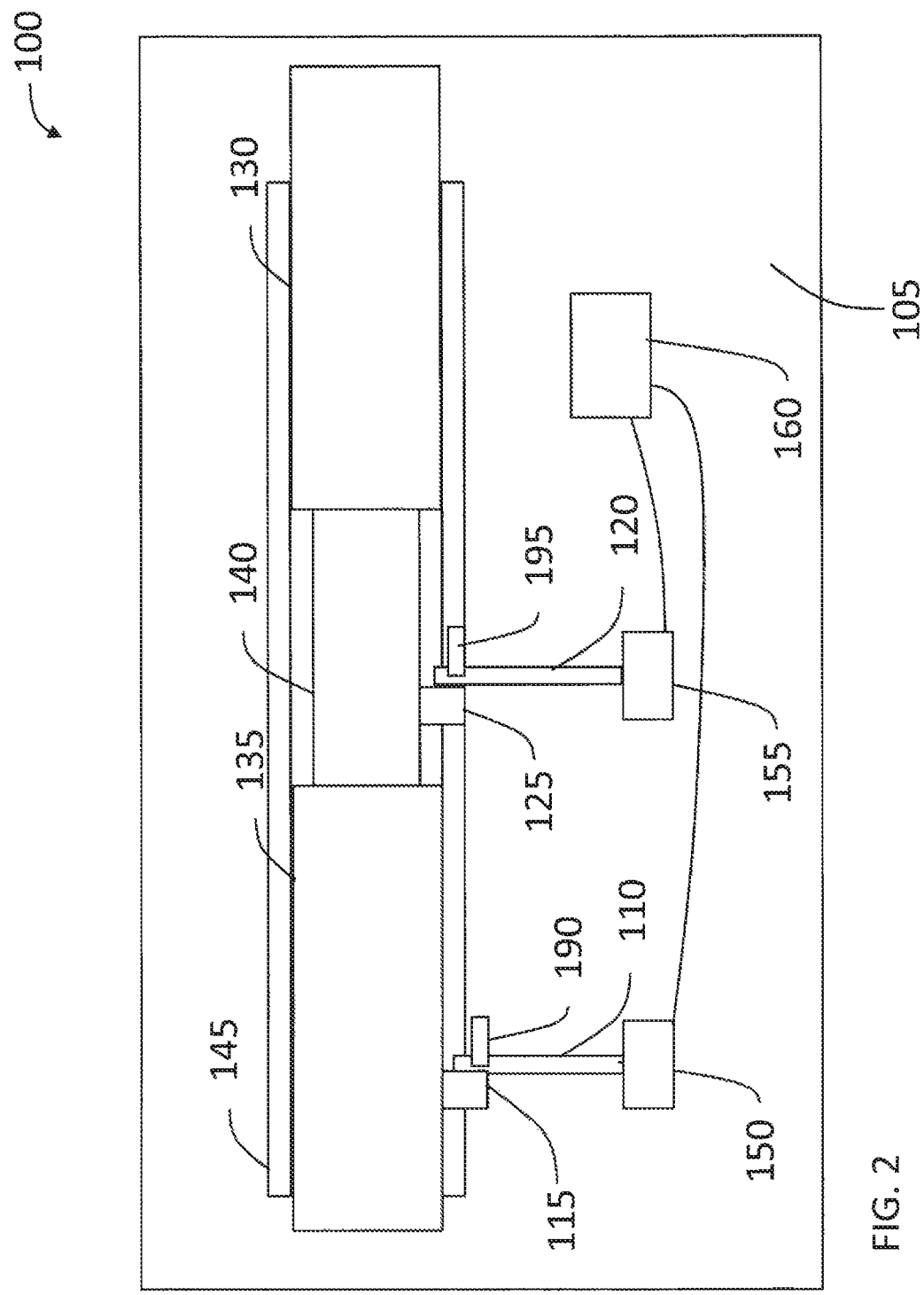
FIG. 2 shows a top view diagram of the outer dimension measuring apparatus of FIG. 1.

FIG. 2 shows a top view of the apparatus 100, so that is clear that first outer dimension of the first section 135 and the second outer dimension of the second section 140 are different in the figure. In some embodiments, the first outer dimension and the second outer dimension may be the same during at least part of a measurement operation.

Figure 3:
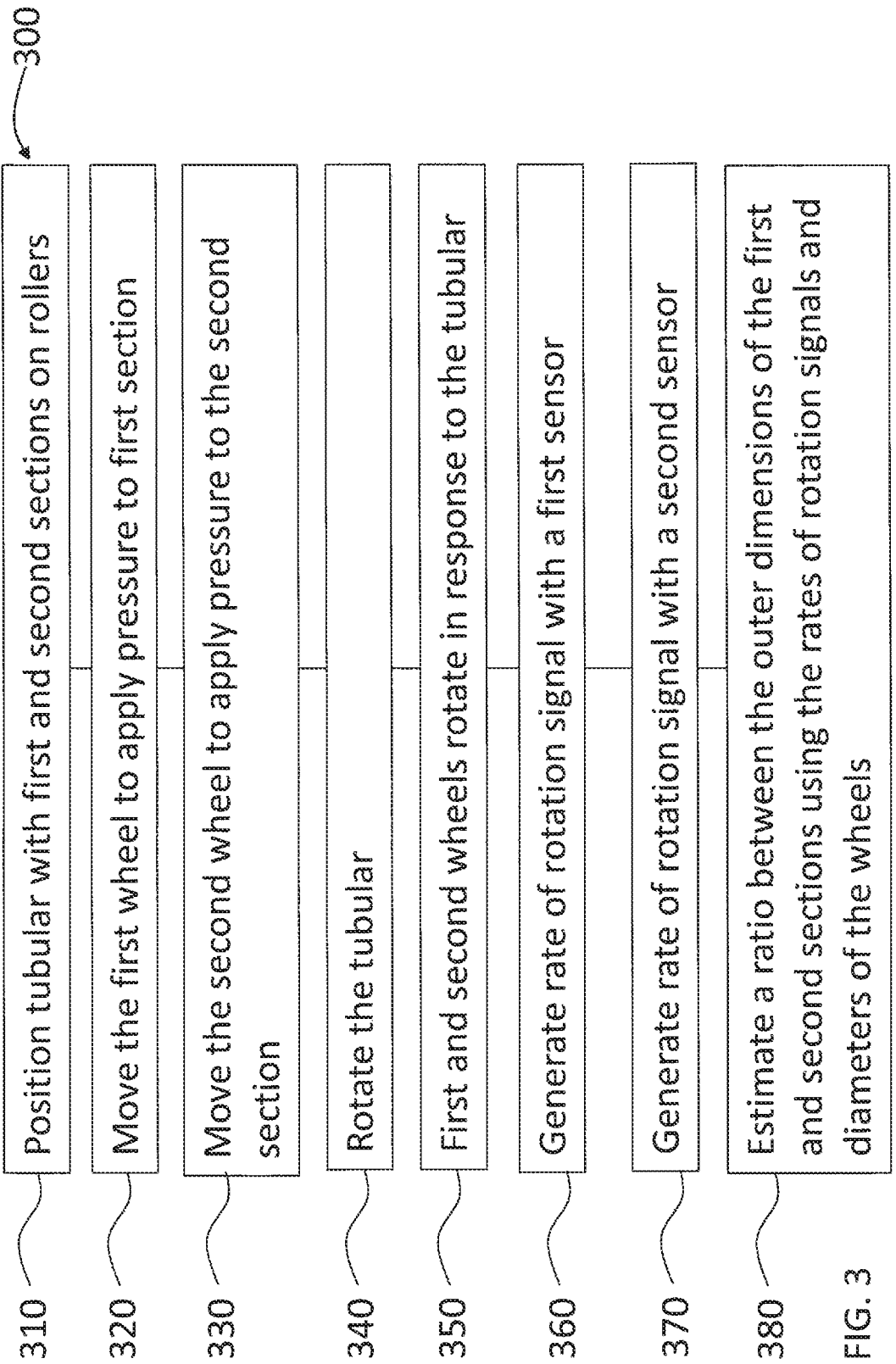
FIG. 3 shows a flow chart of a method for measuring an outer dimension of a tubular using the apparatus of FIG. 1.

FIG. 3 shows a flow chart of method 300 for measuring the outer dimension of the second section 140 relative to the first section 135 of the tubular 130. In step 310, a tubular is placed on the rollers 145. In step 320, the reference arm actuator 150 moves the reference arm 110 in the direction of tubular 130 so that the reference wheel 115 makes contact with and maintains pressure on the first section 135. In step 330, the cut arm actuator 155 moves the cut arm 120 in the direction of tubular 130 so that the cut wheel 125 makes contact with and maintains pressure on the second section 140. In step 340, the tubular 130 is rotated by the rollers 145. In step 350, the reference wheel 115 rotates in response to friction between the reference wheel 115 and the first section 135. In step 360, the first sensor 190 generates a signal indicating the rate of rotation of the reference wheel 115 and communicates said signal to the processor 160. The communication may be performed over a wired or wireless communication channel. In step 370, the second sensor 195 generates a signal indicating the rate of rotation of the cut wheel 125 and communicates said signal to the processor 160. The communication may be performed over a wired or wireless communication channel. In step 380, the processor 160 estimates the outer dimension of the second section 140 based on the signals indicating the rates of rotation of the reference wheel 115 and the cut wheel 125. In some embodiments, the estimate from step 380 may be used in further downstream processes. For example, in a later step, the tubular 130 may be accepted or rejected based on the estimate. In another example, in a later step, a grinding or cutting operation may continue or terminate based on the estimate. In another example, in a later step, a rebuilding or coating operation may continue or terminate based on the estimate.

Processing may include comparing the rate of rotation of the reference wheel 115 and the cut wheel 125 to determine a ratio between the outer dimension of the first section 135 and the outer dimension of the second section 140. One exemplary estimate may be, $$\frac{RPM_{Cut}}{RPM_{Ref}} = \text{Ratio};$$

where $RPM_{cut}$ is the rate of rotation of the cut wheel 125 and $RPM_{Ref}$ is the rate of rotation of the reference wheel 115. If the diameter of the cut wheel 125 differs from the diameter of the reference wheel 115, the ratio may be estimated as follows:

$$\frac{RPM_{Cut}}{RPM_{Ref}} * \frac{D_{Cut}}{D_{Ref}} = \text{Ratio};$$

where $RPM_{cut}$ is the rate of rotation of the cut wheel 125, $RPM_{Ref}$ is the rate of rotation of the reference wheel 115, $D_{cut}$ is the diameter of the cut wheel 125, and $D_{Ref}$ is the diameter of the reference wheel 115. In some embodiments, the respective RPM values may be determined based on a number of pulses received from their respective sensors 190, 195, where the number of pulses/second is proportional to RPM. In some embodiments, some of steps 320-370 may be performed in a different order or simultaneously with other steps as would be understood by a person of ordinary skill in the art.

Figure 4:
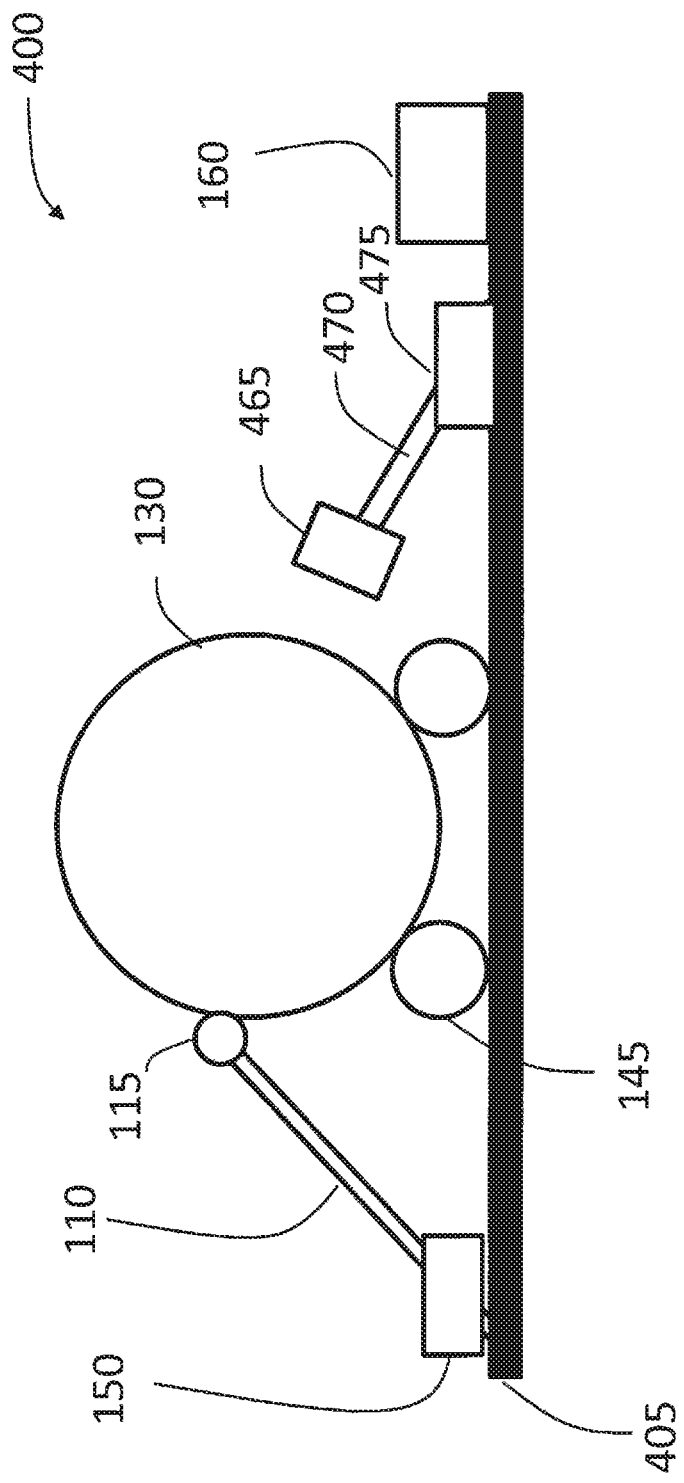
FIG. 4 shows a side view diagram of an outer dimension measuring apparatus with a tubular rotation sensor according to another embodiment of the present disclosure.

FIG. 4 shows forward view of an outer dimension measuring apparatus 400. The apparatus 400 may include a frame 405 to support two or more rollers 145. The rollers 145 are disposed in one or more pairs on the frame 405 and configured to support the tubular 130. As in FIG. 1, the reference arm 110 is connected to the frame 405. The reference wheel 115 is disposed on an end of the reference arm 110, and the actuator 150 is disposed on the end of the reference arm 110 that is connected to the frame 405. The actuator 150 is configured to move the reference arm 110 to apply pressure between the reference wheel 115 and the outer surface of the tubular 130. In this instance, the reference wheel 115 may be positioned against either the first section 135 or the second section 140 of the tubular 130. The pressure between the reference wheel 115 and the tubular 130 provides force to ensure sufficient friction between the reference wheel 115 and the tubular 130 that both rotate without slipping relative to one another. The rotation measurement sensor 190 may be disposed on the reference arm 110 to measure the rate of rotation of the reference wheel 115. A tubular sensor arm 470 may be connected to the frame 405 with a tubular rotation sensor 465 disposed on one end, such that the tubular rotation sensor 465 is positioned to face the tubular 130 on the rollers 145. The tubular rotation sensor 465 may be an optical, magnetic, or electromagnetic sensor configured to measure the rate of rotation of the tubular 130. Exemplary sensors may include, but are not limited to, laser sensors, magnetic sensors, photo sensors, and micro switches. In one embodiment, the tubular rotation sensor 465 may be a Model FFR3/BN-1E photoelectric switch manufactured by Micro Detectors in Modena, Italy. In some instances, the tubular 130 an indicator (see FIG. 5) on its outer surface that can be detected by the tubular rotation sensor 465. In some embodiments, the tubular sensor arm 470 may be attached to an actuator 475 configured to position the tubular sensor arm 470 so that the tubular rotation sensor 465 is suitably aligned with the tubular 130 to perform rate of rotation measurement.

Figure 5:
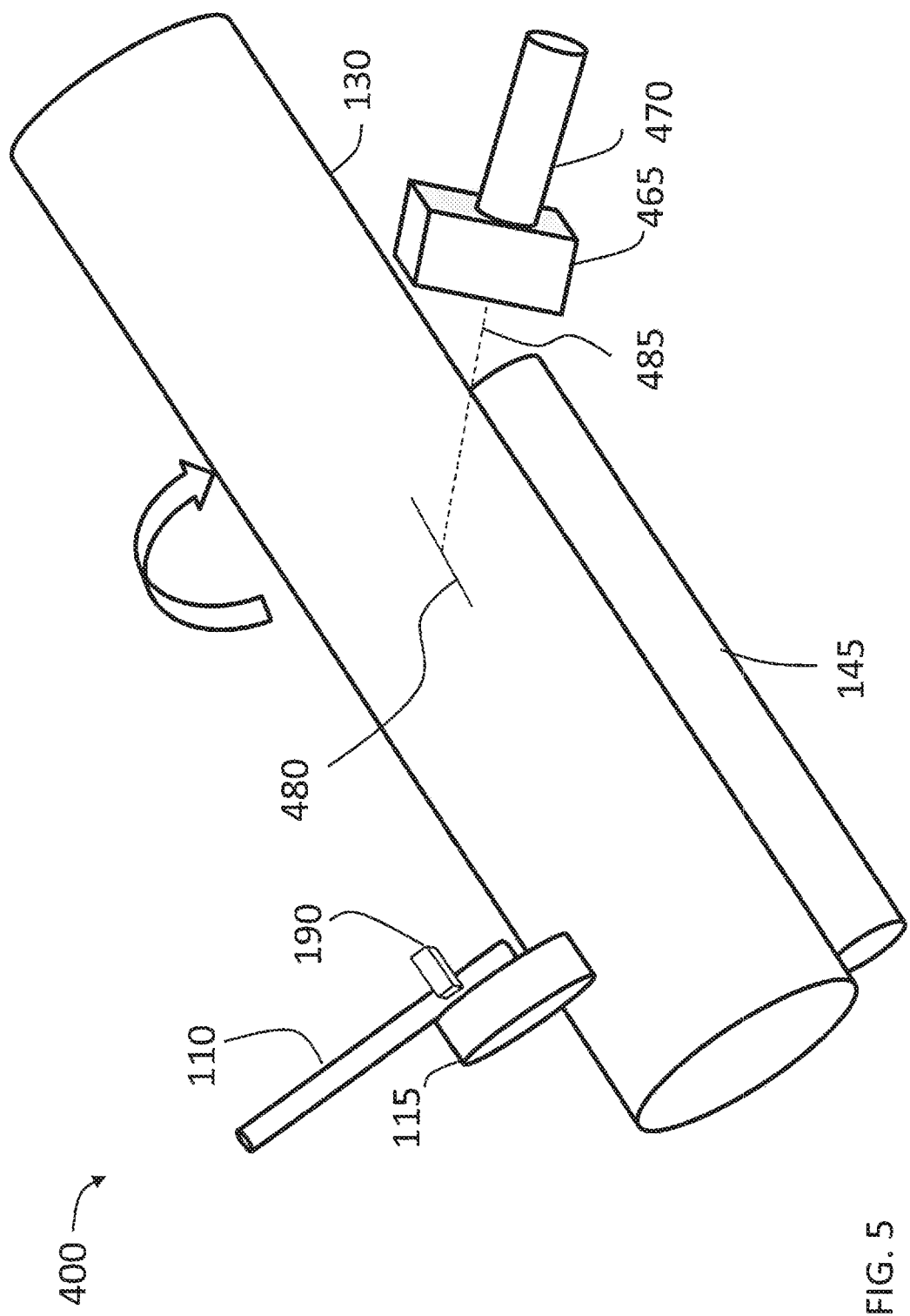
FIG. 5 shows a three-dimensional diagram of the tubular rotation sensor operation for the apparatus of FIG. 4.

FIG. 5 shows a three-dimension close up of the tubular rotation sensor operation of the apparatus 400. The tubular rotation sensor 465 is positioned to detect an indicator 480 disposed on the surface of the tubular 130. When the tubular 130 rotates, the indicator 480 moves past the line-of-sight 485 of the tubular rotation sensor 465. The indicator 480 may be any mark or element that can be detected by the tubular rotation sensor 465 as would be understood by a person of ordinary skill in the art, including marks that are not visible to the human eye. Since the angular rotation of the tubular 130 will be the same at any point along its length, the indicator 480 and the tubular rotation sensor 465 may be positioned in alignment with either the first section 135 or the second section 140. As shown, the reference wheel 115 is longitudinally spaced from the tubular rotation sensor 465; however, this is illustrative and exemplary only, as the tubular rotation sensor 465 may also be perform its measurement at the same longitudinal location as the reference wheel 115. In some embodiments, the tubular rotation sensor 465 may be a magnetic sensor that does not require line-of-sight with the indicator 480 in order to measure the rate of rotation of the tubular 130.

Figure 6:
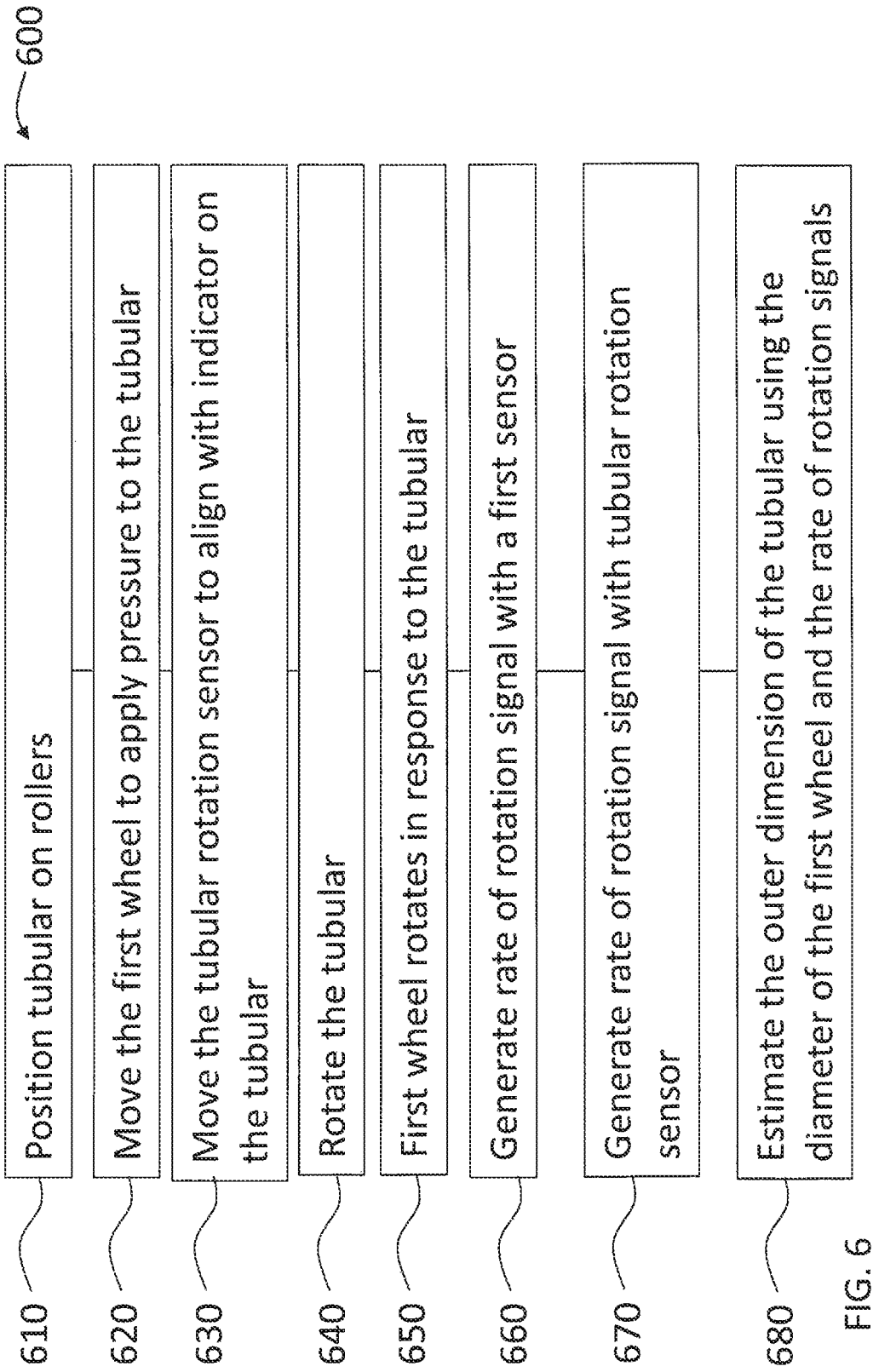
FIG. 6 shows a flow chart of a method for measuring an outer dimension of a tubular using the apparatus of FIG. 4.

FIG. 6 shows a flow chart of method 600 for measuring the outer dimension of the tubular 130. In step 610, a tubular is placed on the rollers 145. In step 620, the reference arm actuator 150 moves the reference arm 110 in the direction of tubular 130 so that the reference wheel 115 makes contact with and maintains sufficient pressure on the first section 135 to prevent slippage between the reference wheel 115 and the tubular 130. In step 630, the actuator 475 moves the tubular rotation sensor arm 470 to align the tubular rotation sensor 465 with the rotational path of the indicator 480 on the tubular 130. In step 640, the tubular 130 is rotated by the rollers 145. In step 650, the reference wheel 115 rotates in response to friction between the reference wheel 115 and the tubular 130. In step 660, the first sensor 190 generates a signal indicating the rate of rotation of the reference wheel 115 and communicates with the processor 160. In step 670, the tubular rotation sensor 465 generates a signal indicating the rate of rotation of the tubular 130 and communicates with the processor 160. In step 680, the processor estimates the outer dimension of the tubular along the path of contact between the reference wheel 115 and the tubular 130. In some embodiments, the estimate from step 680 may be used in further downstream processes. For example, in a later step, the tubular 130 may be accepted or rejected based on the estimate. In another example, in a later step, a grinding or cutting operation may continue or terminate based on the estimate. In another example, in a later step, a rebuilding or coating operation may continue or terminate based on the estimate.

Processing may include estimating the outer dimension of the tubular 130 at the reference wheel 115 by using a formula, such as:

$$T_P = (\pi * D_{Ref}) * \frac{RPM_{Ref}}{RPM_T},$$

where $T_P$ is outer perimeter of the tubular 130, $D_{Ref}$ is the diameter of the reference wheel 115, $RPM_{Ref}$ is the rate of rotation of the reference wheel 115, and $RPM_T$ is the rate of rotation of the tubular 130. In some embodiments, the respective RPM values may be determined based on a number of pulses received from their respective sensors 190, 465, where the number of pulses/second is proportional to RPM. In some rate, in distance per unit time recorded by the sensor 190 may be divided by the rate of rotation of the tubular 130 to estimate an outer perimeter of the tubular 130. In some embodiments, some of steps 660-670 may be performed in a different order or simultaneously with other steps as would be understood by a person of ordinary skill in the art.

Figure 7:
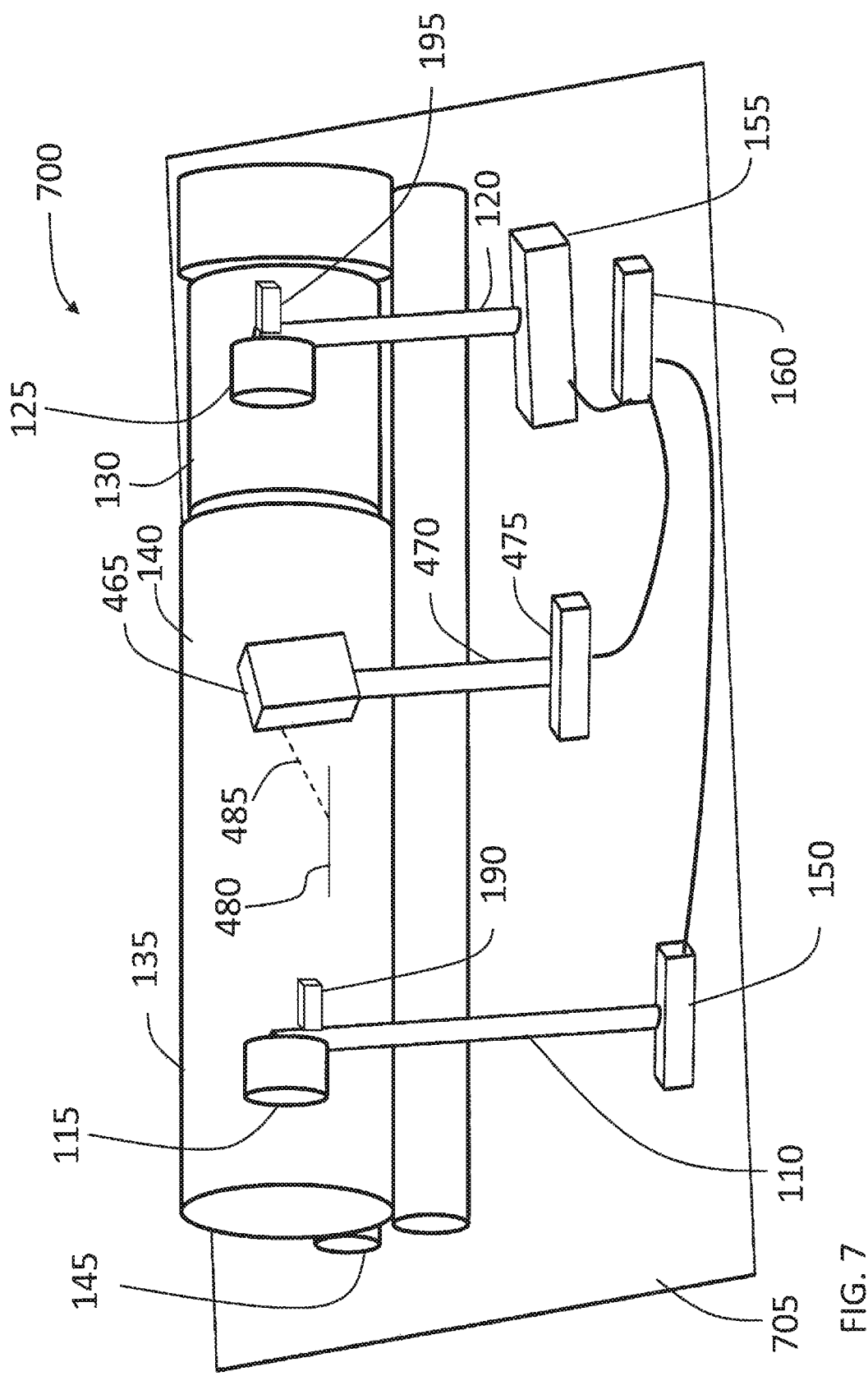
FIG. 7 shows a three-dimensional diagram of an outer dimension measuring apparatus for a tubular including reference and cut wheels and a tubular rotation sensor according to another embodiment of the present disclosure.

FIG. 7 shows a three-dimensional view of an outer dimension measuring apparatus 700. The apparatus 700 includes a frame 705 configured to support the longitudinally spaced wheels 115, 125 featured in the apparatus 100 and the tubular rotation sensor 465 featured in the apparatus 400. Specifically, the frame 705 supports one or more pairs of rollers 145. The frame 705 also provides attachment points for the reference arm 110, the reference arm actuator 150, the cut arm 120, the cut arm actuator 155, the tubular rotation sensor arm 470, and the tubular rotation sensor actuator 475. The reference wheel 115 and the reference wheel rotation sensor 190 may be disposed on the reference arm 110. The cut wheel 125 and the cut wheel rotation sensor 195 may be disposed on the cut arm 120. The tubular rotation sensor 465 may be disposed on the tubular rotation sensor arm 470. All of the arms 110, 120, and 470 are positioned or moveable such that the system 700 may receive a tubular 130 of varying sizes. The reference wheel 115 may be longitudinally separated from the cut wheel 125. The tubular rotation sensor 465 may be longitudinally separated from or coincide with either the reference wheel 115 or the cut wheel 125. The processor 160 may be connected to the frame 705 or remotely in communication with sensors 190, 195, 465. The tubular 130 may include the indicator 480 on either the first section 135 (as shown) or the second section 140. While the first and second sections 135, 140 are shown as having substantially different diameters, this is not necessarily the case, as irregularities in the outer shape of the tubular 130 may result in different diameters having the same outer dimension and similar diameters having different outer dimensions, as would be understood by a person of ordinary skill in the art. In some instances, the apparatus 700 (or even apparatuses 100 and 400) may be used with tubulars 130 that are not irregular in shape or are irregular but the irregularity is uniform along the length of the tubular 130.

In some embodiments, the tubular rotation sensor 465 may be moved, either along the longitude of the tubular 130 or pivoted, to provide rate of rotation measurement of the tubular 130 proximate to the contact points of the reference wheel 115 and the cut wheel 125. When the tubular outer perimeters are known at both of these points, the estimates may be used as accuracy checks for the reference wheel 115, the cut wheel 125, and their respective sensors 190, 195.

Figure 8:
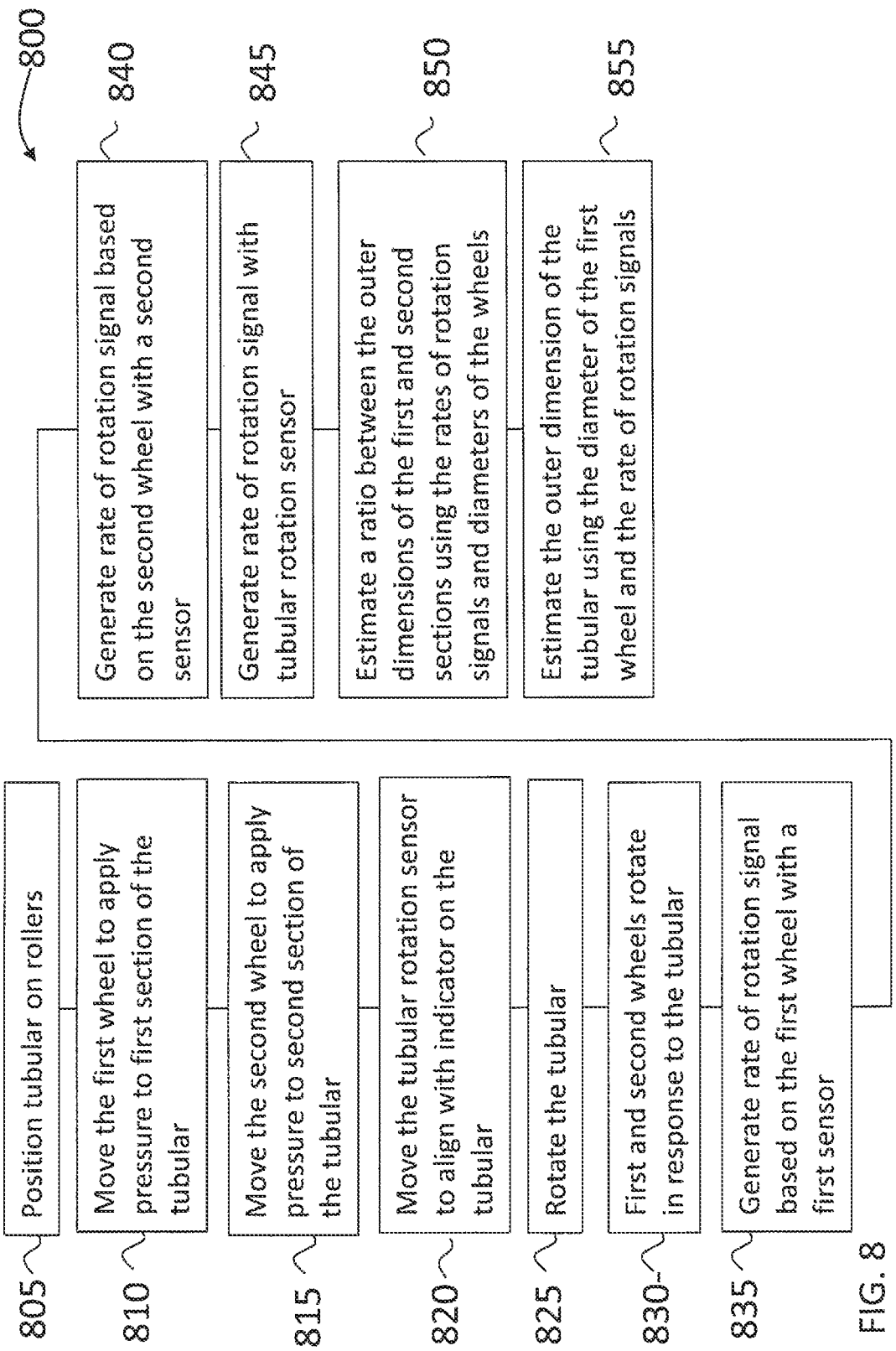
FIG. 8 shows a flow chart of a method for measuring an outer dimension of a tubular using the apparatus of FIG. 7.

FIG. 8 shows a flow chart of method 800 for measuring the outer dimension of the tubular 130. In step 805, a tubular is placed on the rollers 145. In step 810, the reference arm actuator 150 moves the reference arm 110 in the direction of tubular 130 so that the reference wheel 115 makes contact with and maintains pressure on the first section 135. In step 815, the cut arm actuator 155 moves the cut arm 120 in the direction of tubular 130 so that the cut wheel 125 makes contact with and maintains pressure on the second section 140. In step 820, the actuator 475 moves the tubular rotation sensor arm 470 to align the tubular rotation sensor 465 with the rotational path of the indicator 480 on the tubular 130. In step 825, the tubular 130 is rotated by the rollers 145. In step 830, the reference wheel 115 rotates in response to friction between the reference wheel 115 and the first section 135, and the cut wheel 125 rotates in response to friction between the cut wheel 125 and the second section 140. In step 835, the first sensor 190 generates a signal indicating the rate of rotation of the reference wheel 115 and communicates with the processor 160. In step 840, the second sensor 195 generates a signal indicating the rate of rotation of the cut wheel 125 and communicates with the processor 160. In step 845, the tubular rotation sensor 465 generates a signal indicating the rate of rotation of the tubular 130 and communicates with the processor 160. In step 850, the processor estimates the outer dimension of the second section 140 based on the signals indicating the rates of rotation of the reference wheel 115 and the cut wheel 125. In step 855, the processor estimates the outer dimension of the tubular along the path of contact between the reference wheel 115 and the tubular 130. In some embodiments, the estimate from either the step 850 and/or the step 855 may be used in further downstream processes. For example, in a later step, the tubular 130 may be accepted or rejected based on the estimate. In another example, in a later step, a grinding or cutting operation may continue or terminate based on the estimate. In another example, in a later step, a rebuilding or coating operation may continue or terminate based on the estimate.

Processing may include one or more of: 1) estimating the outer dimension of the first section 135, 2) estimating the outer dimension of the second section 140, and 3) estimating the outer dimension of the first section 135 relative to the outer dimension of the second section 140. In some embodiments, processing may include checking the estimated outer dimension ratio between the first section 135 and the second section 140 obtained by 1) and 2) against 3). In some embodiments, some of steps 810-825 may be performed in a different order or simultaneously with other steps as would be understood by a person of ordinary skill in the art. Order may be changed or steps performed simultaneously for steps 835-845 and 850-855, as well.

Figure 9A:
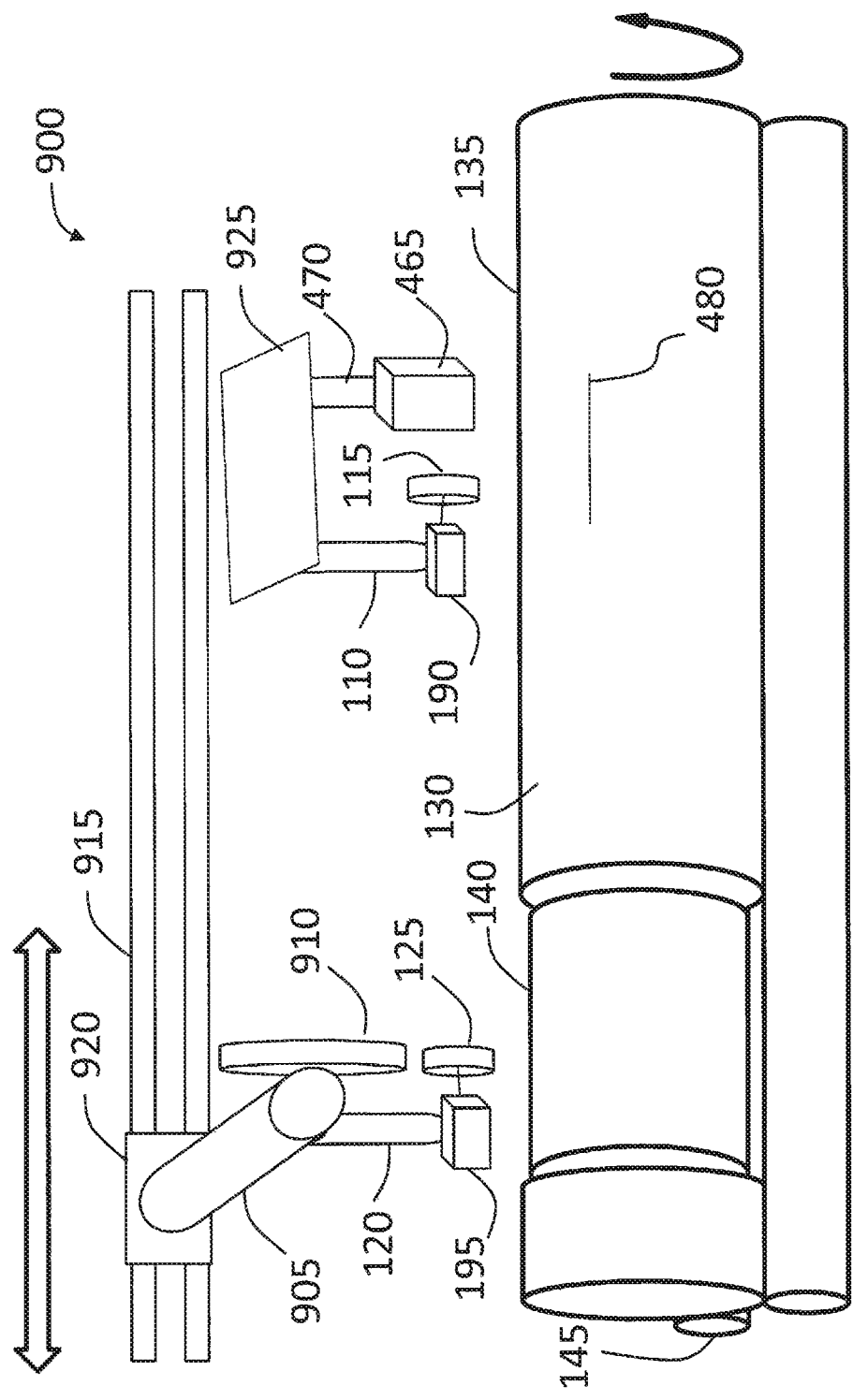
FIG. 9A shows a three-dimensional diagram of an outer dimension measuring apparatus for a tubular including reference and cut wheels and a tubular rotation sensor and a grinder according to another embodiment of the present disclosure.

FIG. 9A shows a three-dimensional view of an outer dimension measuring apparatus 900. The apparatus 900 includes a grinding wheel 910 connected to a grinding arm 905. The grinding arm 905 is connected to a mounting plate 920 that slidably engages a track 915 to enable the grinding wheel to be positioned along the length of the tubular 130. The grinding arm 905 can pivot at the mounting plate 920 to adjust the vertical position of the grinding wheel 910 and the force between the grinding wheel 910 and the tubular 130. Here, the cut wheel 125 and the rotation sensor 195 may be attached to the cut arm 120; however the cut arm 120 may be connected to the grinding arm 905. The reference wheel 115 and the rotation sensor 190 may still be connected to the reference arm 110, and the tubular rotation sensor 465 is still connected to the tubular sensor arm 470; however, the reference arm 110 and the tubular sensor arm 470 may be connected to a frame 925 or frames that are separate from the mounting of the cut arm 120. Thus, the cut wheel 125 and grinding wheel 910 may be positioned laterally along the length of the tubular 130 while the reference wheel 115 and the tubular rotation sensor 465 remain in the same position relative to the tubular 130.

Figure 9B:
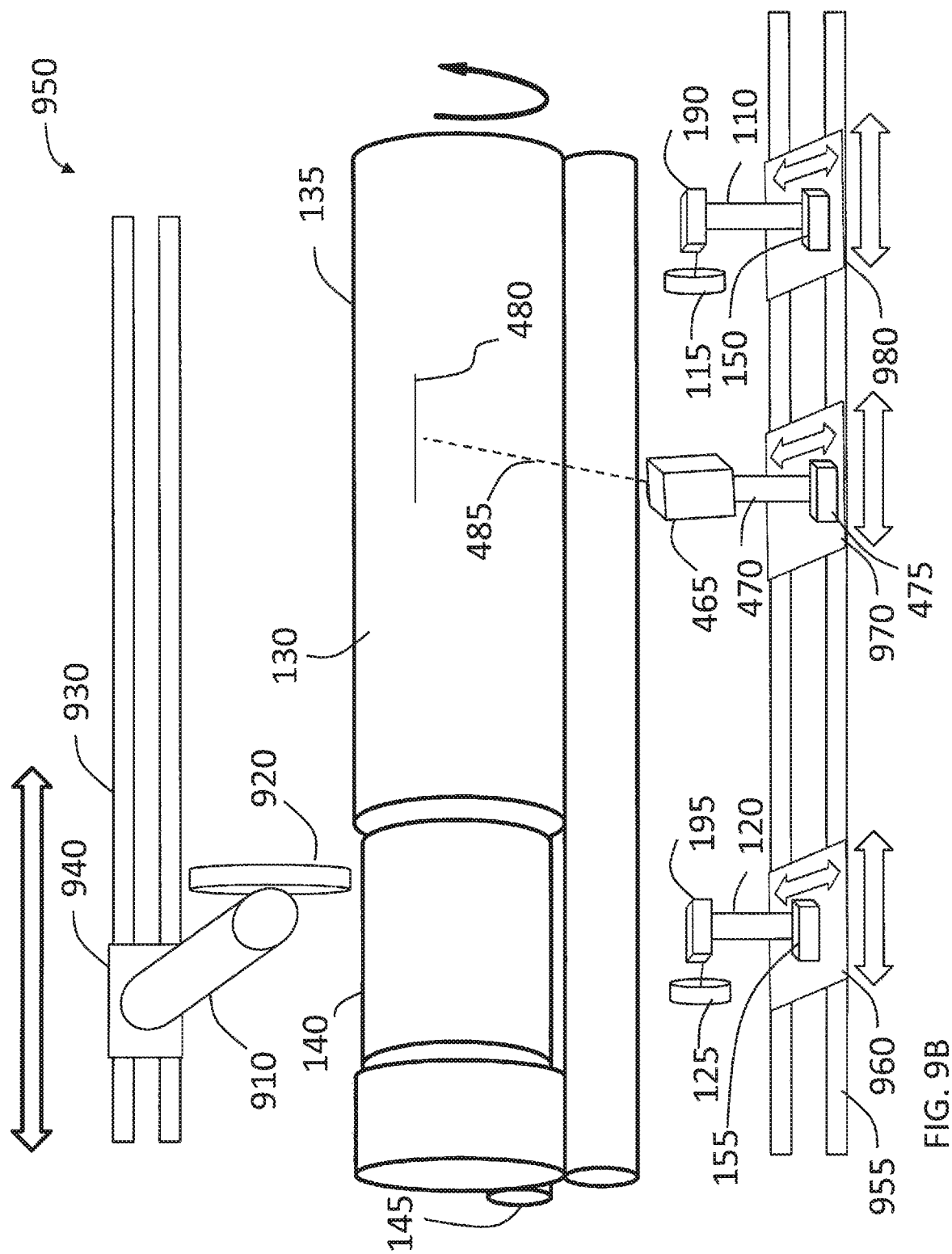
FIG. 9B shows a three-dimensional diagram of an outer dimension measuring apparatus for a tubular including track mounted reference and cut wheels and a tubular rotation sensor with a grinder according to another embodiment of the present disclosure.

FIG. 9B shows a three-dimensional view of an outer dimension measuring apparatus 950. The apparatus 950 is similar to the apparatus 900 in that the grinding wheel 910 and the grinding arm 905 are attached to the mounting plate 920 which slides on the track 915; however, the cut wheel 125, the cut arm 120, and the rotation sensor 195 are disposed on a separate slidable plate or track mount 960 that moves on a second track 955. The cut wheel 115 can be moved laterally along the length of the tubular 130 on the second track 955. Similarly, the reference wheel 115, along with its associated reference arm 110 and rotation sensor 190, may be connected to a slidable track mount 980, which can slide along the second track 955. Also, the tubular rotation sensor 465, along with its associated tubular rotation sensor arm 470, may be connected to a slidable track mount 970. All of the track mounts 960, 970, 980 may be moved laterally, separately or in combinations, along the tubular 130. One or more of the arms 120, 470, 110 may be repositioned toward or away from the tubular 130, or used to apply force between the reference wheel 115 and/or the cut wheel 125 and the tubular 130. In some embodiments, the arms 120, 470, 110 may be moved toward or away from the tubular 130 by one or more of their respective actuators 155, 475, 150. While each arm 120, 470, 110 is shown attached to its own track mount 960, 970, 980, this is exemplary and illustrative only, and it is contemplated that two or more of the track mounts 960, 970, 980 may be replaced by a mount that attaches to two or more of the arms 120, 470, 110.

While the disclosure has been described with reference to exemplary embodiments, it would be understood by a person of ordinary skill in the art that various changes may be made and equivalents may be substituted for elements thereof without departing from the scope of the disclosure.

In addition, many modifications will be appreciated to adapt a particular instrument, situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An apparatus, comprising:
   a frame;
   a set of rollers having a length and configured to rotate a tubular and supported by the frame;
   a first arm supported by the frame;
   a first wheel disposed on the first arm;
   a first sensor configured to estimate the rate of rotation of the first wheel;
   a second arm supported by the frame;
   a second wheel disposed on the second arm and longitudinally separated along the length of the rollers from the first wheel;
   a second sensor configured to estimate the rate of rotation of the second wheel; and
   a processor in communication with the first sensor and the second sensor.

2. The apparatus of claim 1, further comprising:
   an actuator disposed between the first arm and the frame and configured to move the first wheel to apply pressure between the first wheel and the tubular.

3. The apparatus of claim 1, further comprising:
   an actuator disposed between the second arm and the frame and configured to move the second wheel to apply pressure between the second wheel and the tubular.

4. The apparatus of claim 1, wherein the first sensor is disposed on the first arm.

5. The apparatus of claim 1, wherein the second sensor is disposed on the second arm.

6. The apparatus of claim 1, further comprising:
   a tubular rotation sensor configured to detect an indicator on the tubular, wherein the tubular rotation sensor is in communication with the processor.

7. The apparatus of claim 6, further comprising:
   a tubular rotation sensor arm supported by the frame and configured to position the tubular rotation sensor relative to the tubular.

8. An apparatus, comprising:
   a frame;
   a set of rollers configured to rotate a tubular and supported by the frame;
   a first arm supported by the frame;
   a first wheel disposed on the first arm;
   a first sensor configured to estimate the rate of rotation of the first wheel;
   a tubular rotation sensor configured to detect an indicator on the tubular;
   a processor in communication with the first sensor and the tubular rotation sensor; and
   a tubular rotation sensor arm supported by the frame and configured to position the tubular rotation sensor relative to the tubular.

9. The apparatus of claim 8, further comprising:
   an actuator disposed between the tubular rotation sensor arm and the frame and configured to move the tubular rotation sensor arm relative to the tubular.

10. The apparatus of claim 8, wherein the first sensor is disposed on the first arm.

11. The apparatus of claim 8, further comprising:
    a second arm supported by the frame;
    a second wheel disposed on the second arm and longitudinally separated along the length of the rollers from the first wheel; and
    a second sensor configured to estimate the rate of rotation of the second wheel;
    wherein the second wheel is longitudinally separated from the first wheel along a length of the set of rollers.

12. An apparatus, comprising:
    a frame;
    a set of rollers having a length and configured to rotate a tubular and supported by the frame;
    a first arm supported by the frame;
    a first wheel disposed on the first arm;
    a first sensor configured to estimate the rate of rotation of the first wheel;
    a second arm supported by the frame;
    a second wheel disposed on the second arm and longitudinally separated along the length of the rollers from the first wheel;
    a second sensor configured to estimate the rate of rotation of the second wheel;
    a tubular rotation sensor configured to detect an indicator on the tubular; and
    a processor in communication with the first sensor, the second sensor, and the tubular rotation sensor.

13. The apparatus of claim 12, further comprising:
    an actuator disposed between at least one of: the first arm and the frame, the second arm and the frame, and the tubular rotation sensor arm and the frame.

* * * * *